(12) United States Patent
Mizorogi

(10) Patent No.: US 6,779,622 B2
(45) Date of Patent: Aug. 24, 2004

(54) STRUCTURE FOR COOLING POWER DRIVE UNIT FOR AUTOMOBILE

(75) Inventor: Takafumi Mizorogi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 52 days.

(21) Appl. No.: 09/983,778

(22) Filed: Oct. 25, 2001

(65) Prior Publication Data

US 2002/0056540 A1 May 16, 2002

(30) Foreign Application Priority Data

Oct. 26, 2000 (JP) ...................................... 2000-326948

(51) Int. Cl.[7] .................................................. B60K 5/04
(52) U.S. Cl. ..................... 180/297; 180/68.1; 123/41.56
(58) Field of Search ............................... 180/68.1, 297; 123/41.42, 41.48, 41.56, 41.57; 165/41, 42, 43

(56) References Cited

U.S. PATENT DOCUMENTS

| | | | | |
|---|---|---|---|---|
| 4,267,895 A | * | 5/1981 | Eggert, Jr. ................. | 180/68.1 |
| 4,618,023 A | * | 10/1986 | Norlin ......................... | 180/312 |
| 4,934,449 A | * | 6/1990 | Watt et al. .................... | 165/41 |
| 5,082,075 A | * | 1/1992 | Karolek et al. ............ | 180/68.2 |
| 5,427,502 A | * | 6/1995 | Hudson .................... | 415/211.1 |
| 5,490,572 A | * | 2/1996 | Tajiri et al. ................. | 180/65.1 |
| 5,531,285 A | * | 7/1996 | Green ....................... | 180/65.2 |
| 5,542,489 A | * | 8/1996 | Allison et al. ............. | 180/68.5 |
| 5,588,482 A | * | 12/1996 | Holka ......................... | 165/44 |
| 5,680,757 A | * | 10/1997 | Pirchl .......................... | 60/299 |
| 5,816,350 A | * | 10/1998 | Akira et al. ............... | 180/68.1 |
| 5,915,494 A | * | 6/1999 | Matsumura et al. ........ | 180/232 |
| 5,978,719 A | * | 11/1999 | Yano et al. .................... | 701/22 |
| 6,026,768 A | * | 2/2000 | Spitler et al. ............. | 123/41.58 |
| 6,050,233 A | * | 4/2000 | Vilou ....................... | 123/179.3 |
| 6,093,974 A | * | 7/2000 | Tabata et al. ............. | 290/40 R |
| 6,138,784 A | * | 10/2000 | Oshima et al. ............. | 180/65.2 |
| 6,152,096 A | * | 11/2000 | Setsuda .................. | 123/184.21 |
| 6,167,976 B1 | * | 1/2001 | O'Neill et al. ............. | 180/69.2 |
| 6,199,518 B1 | * | 3/2001 | Hotta et al. .............. | 123/41.44 |
| 6,213,233 B1 | * | 4/2001 | Sonntag et al. ............ | 180/65.2 |
| 6,230,677 B1 | * | 5/2001 | Setsuda .................. | 123/184.21 |
| 6,237,357 B1 | * | 5/2001 | Hirao et al. .................. | 62/325 |
| 6,247,437 B1 | * | 6/2001 | Yamaguchi et al. ..... | 123/179.3 |
| 6,315,069 B1 | * | 11/2001 | Suba et al. ................ | 180/68.5 |
| 6,457,542 B1 | * | 10/2002 | Hosono et al. ............ | 180/68.1 |
| 6,516,254 B1 | * | 2/2003 | Wakashiro et al. ........... | 701/22 |

FOREIGN PATENT DOCUMENTS

JP           11-257115           9/1999

* cited by examiner

Primary Examiner—Brian L. Johnson
Assistant Examiner—Kelly E Campbell
(74) Attorney, Agent, or Firm—Armstrong, Kratz, Quintos, Hanson & Brooks, LLP

(57) ABSTRACT

To cool a power drive unit for controlling the operation of a motor-generator connected to an engine and function as either a motor or a generator, an electric power drive unit-accommodating chamber is defined outside a side frame disposed on a side of an engine room with the engine accommodated therein in a widthwise direction of a vehicle, and is separated from the engine room. The electric power drive unit is accommodated in the power drive unit-accommodating chamber. A cooling device is integrally provided on the electric power drive unit to use cooling water to perform heat exchange with travel wind, and a heat shield plate is mounted between the engine room and the electric power drive unit-accommodating chamber.

9 Claims, 7 Drawing Sheets

STRUCTURE FOR COOLING POWER DRIVE UNIT FOR AUTOMOBILE

BACKGROUND OF THE INVENTION

1. Field of the Invention

The present invention relates to a structure for cooling a power drive unit for controlling the operation of a motor-generator connected to an engine and functioning as either a motor or a generator.

2. Description of the Related Art

There is a system, as disclosed in Japanese Patent Application Laid-open No. 11-257115, in which a motor-generator functioning as either a motor or a generator is connected to an engine, in which it functions as a motor to assist in the starting of the engine or in a driving force from the engine, and it functions as a generator to generate power by the driving force from the engine or to generate a power by regenerative braking.

Such a power drive unit for the motor-generator controls a large amount of current, using a large-sized switching element and hence, in order to prevent a reduction in durability of the power drive unit due to the heating of the power drive unit, it is necessary to sufficiently cool the power drive unit. In the conventionally known system, the power drive unit is accommodated in an engine room and, for this reason, there is a possibility that the power drive unit receives heat generated by the engine in addition to heat generated by itself, resulting in a rise in temperature thereof, and the cooling of the power drive unit is insufficient.

SUMMARY OF THE INVENTION

The present invention has been accomplished with the above circumstance in view, and it is an object of the present invention to enhance the effect of cooling the power drive unit for controlling the operation of the motor-generator connected to the engine.

To achieve the above object, in the present invention there is provided a structure for cooling a power drive unit for an automobile for controlling the operation of a motor-generator connected to an engine and functioning as either a motor or a generator. The structure includes a power drive unit-accommodating chamber, which is defined outside a side frame disposed on a side of an engine room with the engine accommodated therein in a widthwise direction of a vehicle, so that it is separated from the engine room, and the power drive unit is accommodated in the power drive unit-accommodating chamber, so that it is cooled by travel wind.

With the above arrangement, the power drive unit-accommodating chamber is defined outside the side frame disposed on the side of the engine room in the widthwise direction of the vehicle, and the power drive unit accommodated in the power drive unit-accommodating chamber is cooled by the travel wind. Therefore, the power drive unit in the power drive unit-accommodating chamber separated from the engine room receives only a small amount of the heat generated by the engine and, moreover, is cooled effectively by the travel wind, leading to an enhanced cooling effect. In addition, the power drive unit is disposed outside the engine room and, hence, the layout of other auxiliary parts within the engine room is easily achieved.

A heat shield plate is preferably disposed between the engine room and the power drive unit-accommodating chamber.

With the above arrangement, heat generated by the engine can be shielded by an effect of the heat shield plate disposed between the engine room and the power drive unit-accommodating chamber, thereby further effectively preventing a rise in temperature of the power drive unit.

The power drive unit preferably includes a cooling device adapted to perform the heat exchange with the travel wind through cooling water.

With the above arrangement, the cooling device adapted to perform the heat exchange with the travel wind through cooling water is provided on the power drive unit and hence, the effect of cooling the power drive unit can be further enhanced.

The power drive unit and the cooling device are preferably formed integrally with each other and mounted to a vehicle body.

With the above arrangement, the power drive unit and the cooling device are formed integrally with each other and mounted to the vehicle body and hence, as compared with a case where they are separately attached to the vehicle body, the number of mounting steps and the number of mounted parts can be reduced.

BRIEF DESCRIPTION OF THE DRAWINGS

The present invention will now be described by way of embodiments of the present invention shown in the accompanying drawings.

FIG. 1 is a view of a series multi-cylinder engine, taken in an axial direction of a crankshaft;

FIG. 2 is an enlarged view of an essential portion shown in FIG. 1;

FIG. 3 is a sectional view taken along a line 3—3 in FIG. 2;

FIG. 4 is a plan view of an engine room;

FIG. 5 is a perspective view of a power drive unit and a cooling device;

FIG. 6 is a view taken in a direction of an arrow 6 in FIG. 5; and

FIG. 7 is a view taken in a direction of an arrow 7 in FIG. 5.

DETAILED DESCRIPTION OF THE PREFERRED EXEMPLARY EMBODIMENT

Figure 1:
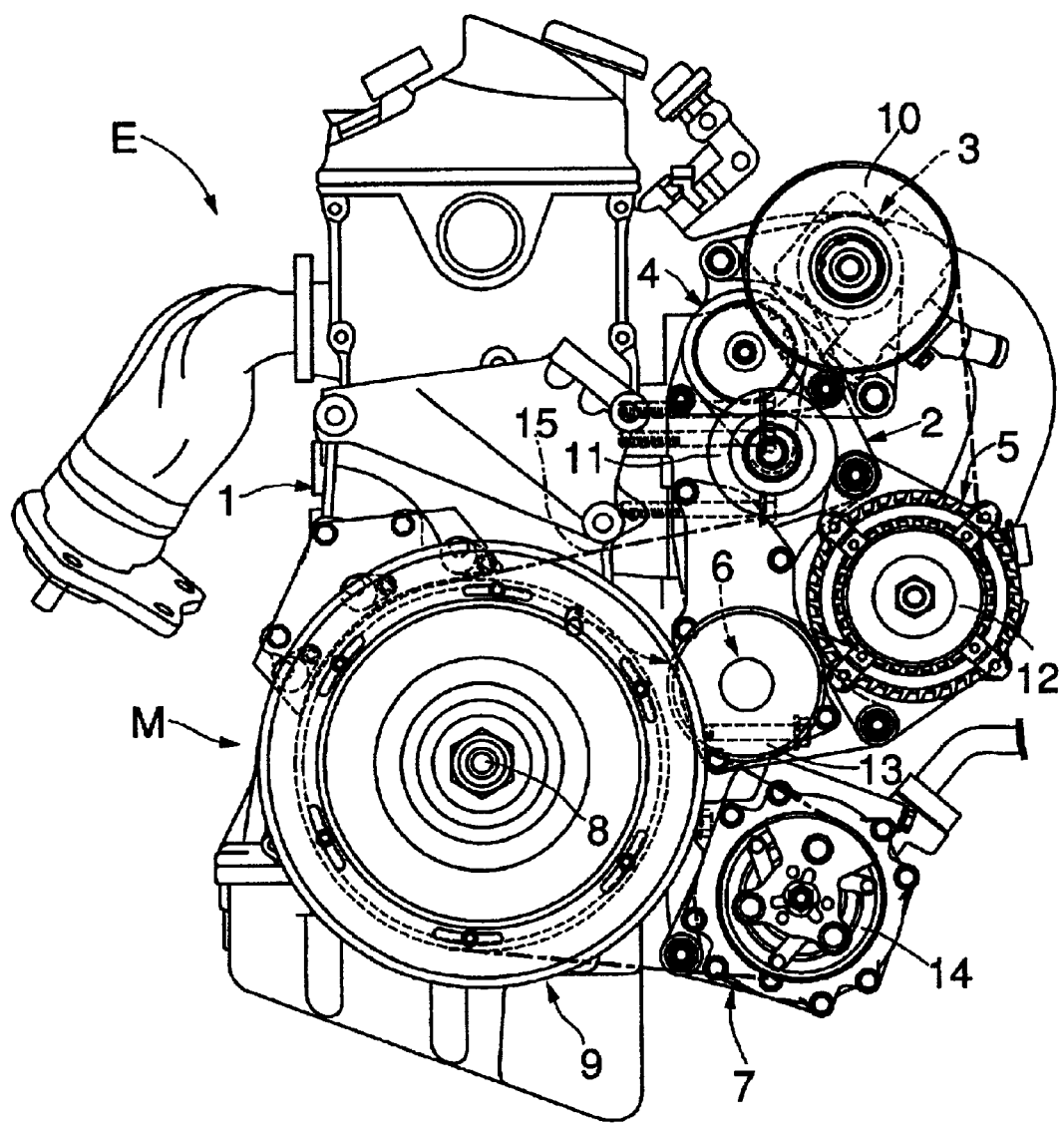
FIGS. 1 to 7 show a first embodiment of the present invention, where.

As shown in FIG. 1, an auxiliary part-mounting bracket 2 is fixed to a side of a cylinder block 1 of a series multi-cylinder engine E mounted on a vehicle. Fixed to the auxiliary part-mounting bracket 2 are a power-steering oil pump 3, an auto-tensioner 4, an alternator 5, an engine-cooling water pump 6 and an air-conditioning compressor 7. A single endless belt 15 is reeved around a crank pulley 9 mounted at an end (an end on the side opposite from a transmission) of a crankshaft 8 of the engine E, an oil pump pulley 10 mounted on the oil pump 3, a tensioner pulley 11 mounted on the auto-tensioner 4, an alternator pulley 12 mounted on the alternator 5, a water pump pulley 13 mounted on the water pump 6 and a compressor pulley 14 mounted on the compressor 7, so that a driving force from the crankshaft 8 is transmitted to the oil pump 3, the alternator 5, the water pump 6 and the compressor 7 by the endless belt 15, and a tension is applied to the endless belt 15 by the auto-tensioner 4.

The tensioner pulley 11 and the water pump pulley 13 are driven by a back of the endless belt 15. By using the single belt 15 and utilizing its back, as described above, the auxiliary parts 3, 4, 5, 6 and 7 can be disposed more compactly together, but also a satisfactory angle of winding contact of the endless belt 15 with each of the pulleys 10 to 14 can be ensured to reliably drive the auxiliary parts 3 to 7.

Figure 2:
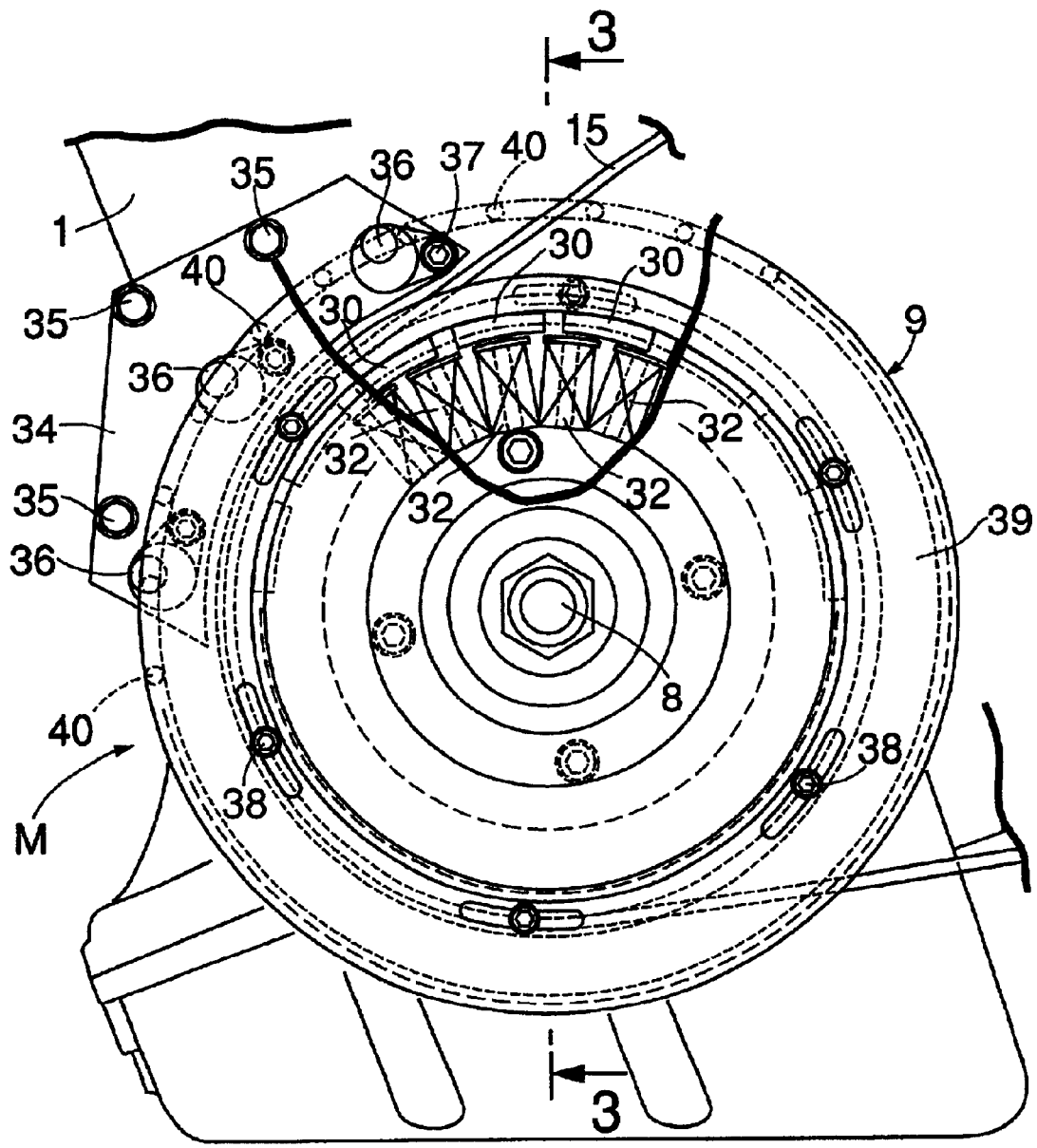
Figure 3:
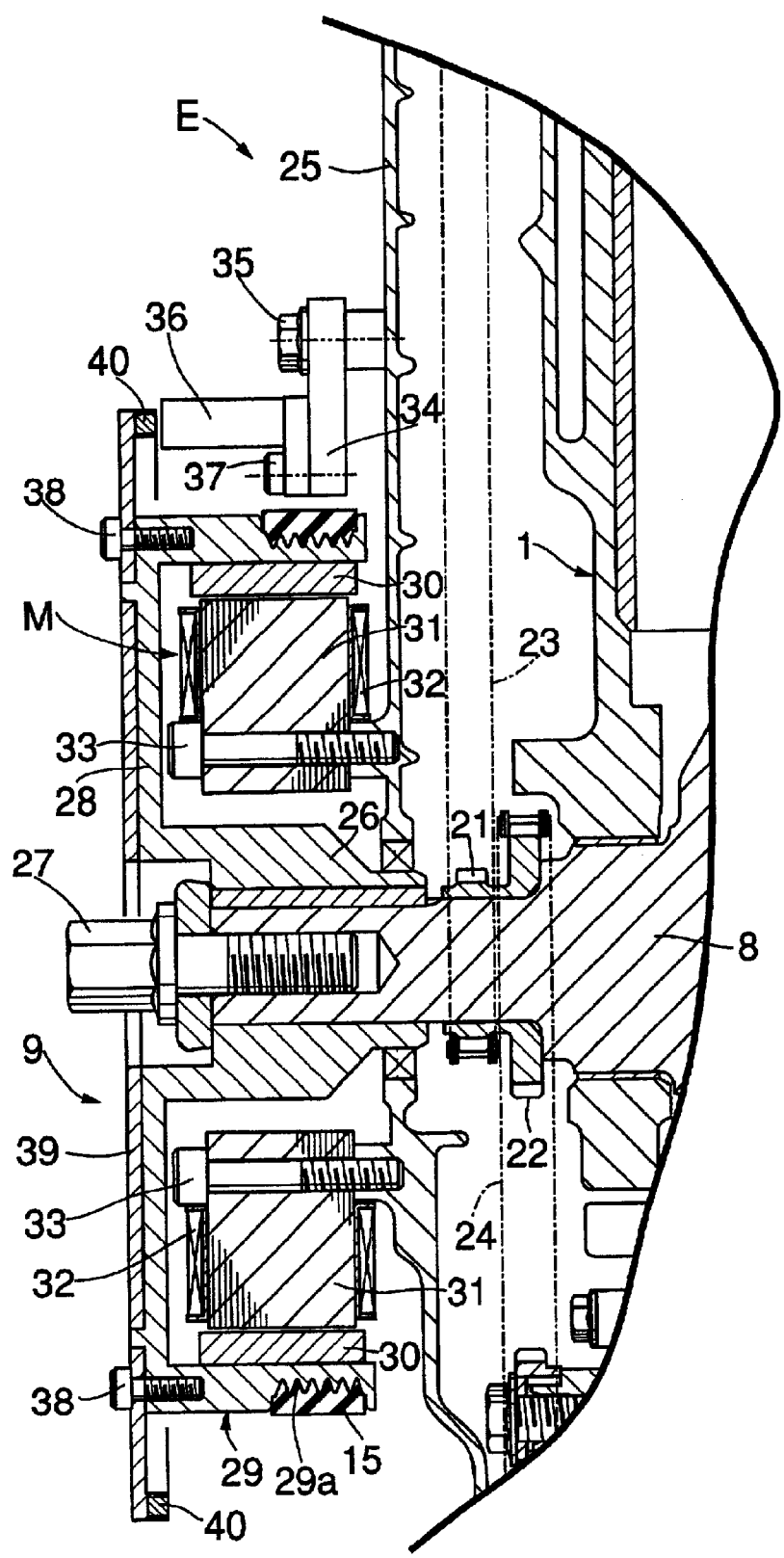

As can be seen from FIGS. 2 and 3, a camshaft driving sprocket 21 and a balancer shaft-driving sprocket 22 formed integrally each other are fixed to the crankshaft 8 protruding from the cylinder block 1. An endless chain 23 reeved around the camshaft driving sprocket 21 and an endless chain 24 reeved around the balancer shaft-driving sprocket 22 are covered with a chain cover 25 fixed to the cylinder block 1.

A boss 26 of the crank pulley 9 is fitted over an end of the crankshaft 8 protruding from the chain cover 25. An annular peripheral wall 29 is integrally formed at an outer end of a disk-shaped sidewall 28 extending radially from the boss 26 of the crank pulley 9, and has a pulley groove 29a defined in its outer peripheral surface, so that the endless belt 15 is engaged into the pulley groove 29a. An annular space is defined within the crank pulley 9 and surrounded by the boss 26, the sidewall 28 and the peripheral wall 29, and a motor-generator M is accommodated in the space.

The motor-generator M includes a plurality of permanent magnets 30 fixed to an inner peripheral surface of the peripheral wall 29 of the crank pulley 9. The permanent magnets 30 constitute a rotor of the motor-generator M. A plurality of coils 32 wound around cores 31, respectively, are fixed to an outer surface of the chain cover 25 by bolts 33 to surround the periphery of the crankshaft 8. The coils 32 constitute a stator of the motor-generator M, with their outer peripheral surfaces opposed to inner peripheral surface of the permanent magnets 30 with small air gaps left therebetween.

A plate-shaped mounting bracket 34 is fixed to the outer surface of the chain cover 25 by three bolts 35, and three rotational speed sensors 36 are fixed to the mounting bracket 34 by bolts 37, respectively. A plurality of portions 40 to be detected by the rotational speed sensors 36 are provided on an outer periphery of a disk 39 fixed to the sidewall 28 of the crank pulley 9 by bolts 38.

Thus, if the coils 32 of the motor-generator M are not excited, the crank pulley 9 merely functions as a simple pulley. However, if the coils 32 are exited alternately at a predetermined timing, a attracting force and repulsing force can be applied to the permanent magnets 30 to drive the crank pulley 9 in rotation. Thus, it is possible not only to restart a stopped engine E to permit the cranking of the crankshaft 8, but also to assist in the driving force from the engine E during traveling of a vehicle. When the crankshaft 8 is rotated by a driving force transmitted from a driving wheel back to the engine during braking of the vehicle, the motor-generator M can be braked in a regenerative manner to generate power. Alternatively, the motor-generator M can be driven by the driving force from the engine to generate power.

As described above, the motor-generator M is accommodated within the crank pulley 9 of the engine E and, hence, it is possible to minimize the sizes of the engine E and the transmission are a result of mounting the motor-generator M to facilitate the mounting of the engine in the engine room.

Figure 4:
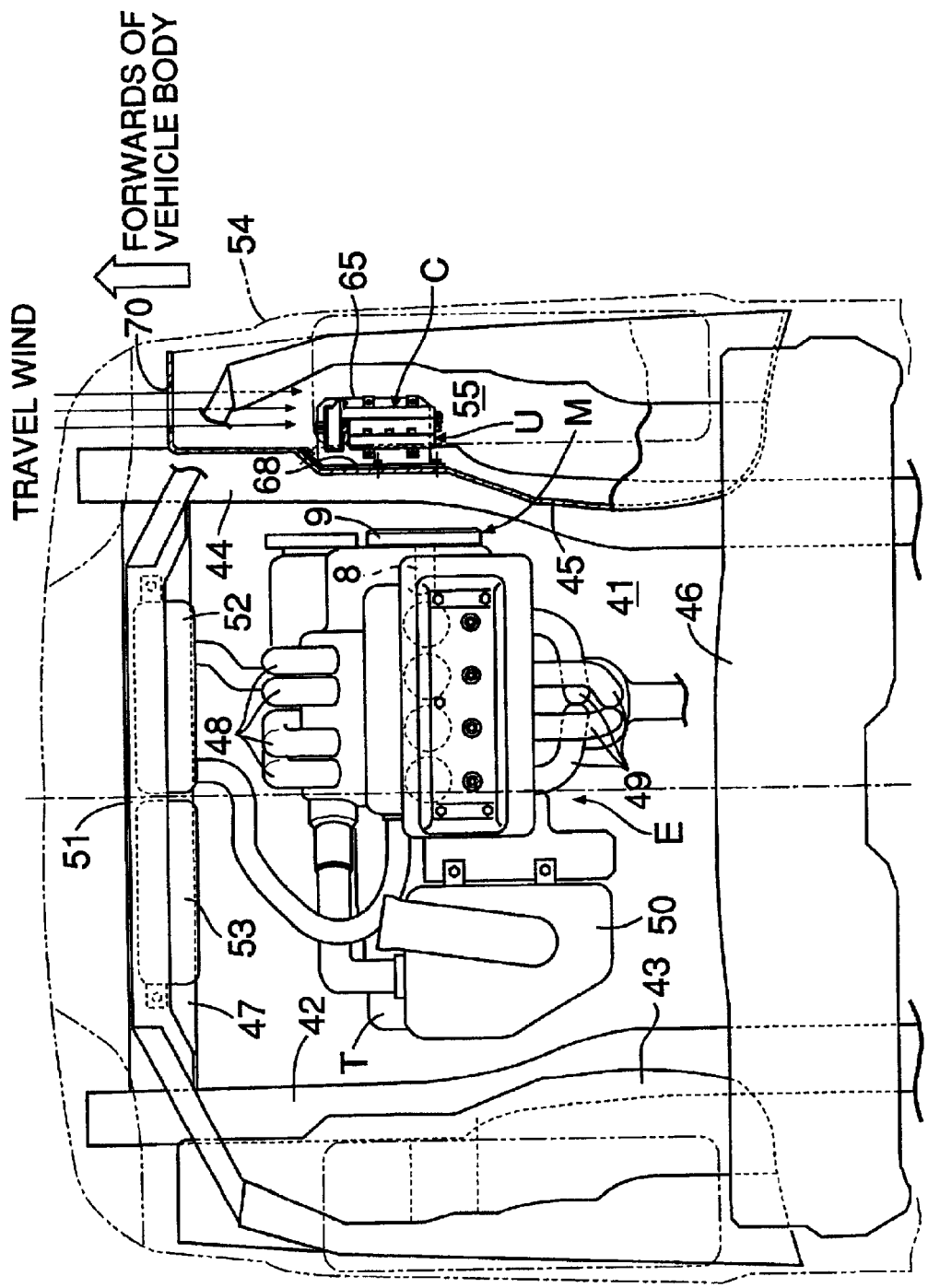

As shown in FIG. 4, the engine room 41, in which the engine E having the above-described arrangement is mounted, has a left side face demarcated by a left front fender apron 43 rising from a left side frame 42, and a right side face demarcated by a right front fender apron 45 rising from a right side frame 44. Rear portions of the left and right side frames 42 and 44 are connected to each other by a front cowl 46 constituting a rear wall of the engine room 41, and front portions of the left and right side frames 42 and 44 are connected to each other by a front cross member 47. The engine E is mounted horizontally, so that the crankshaft 8 extends in a lateral direction of a vehicle body, and the crank pulley 9 is located on the right side of the vehicle body. Intake passages 48 are connected to a front surface of the engine E, and exhaust passages 49 are connected to a rear surface of the engine E.

A transmission T is coupled to a left side face of the engine E, and an air cleaner 50 is supported on an upper surface of the transmission T and connected to the intake passages 48. A radiator 52 for the engine E and a condenser 53 for an air conditioner are disposed between the front cross member 47 and a radiator support 51 connecting front ends of the left and right front fender aprons 43 and 45.

An assembly comprising a power drive unit U for controlling the operation of the motor-generator M and a cooling device C integral with the power drive unit U is accommodated in a power drive unit-accommodating chamber 55 defined between the right front fender apron 45 and a right front fender 54 coupled to an outer side of the right front fender apron 45. A travel wind intake port 70 is defined in a front end of the power drive unit-accommodating chamber 55 for introducing travel wind into the power drive unit-accommodating chamber 55.

Figure 5:
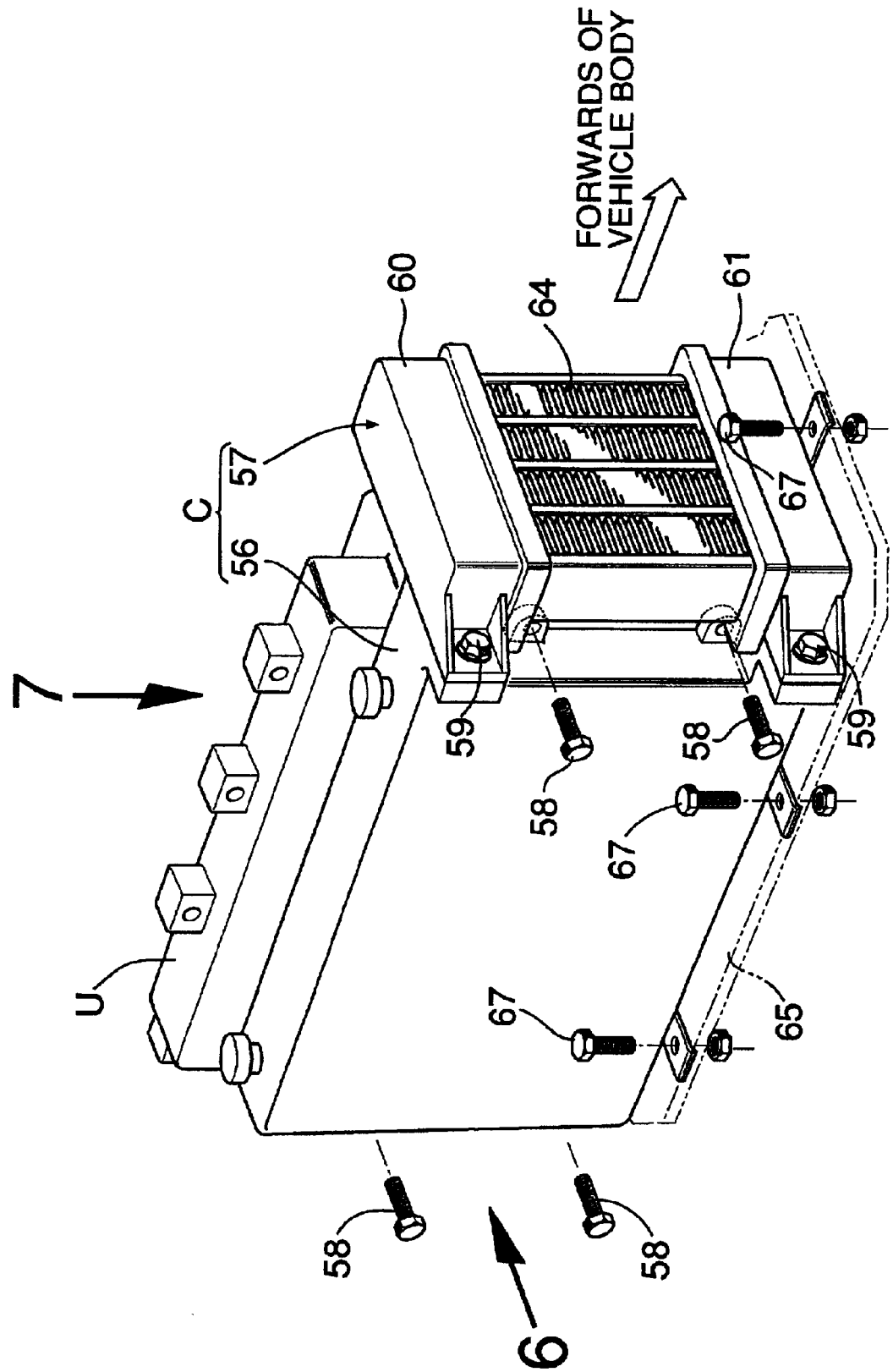
Figure 6:
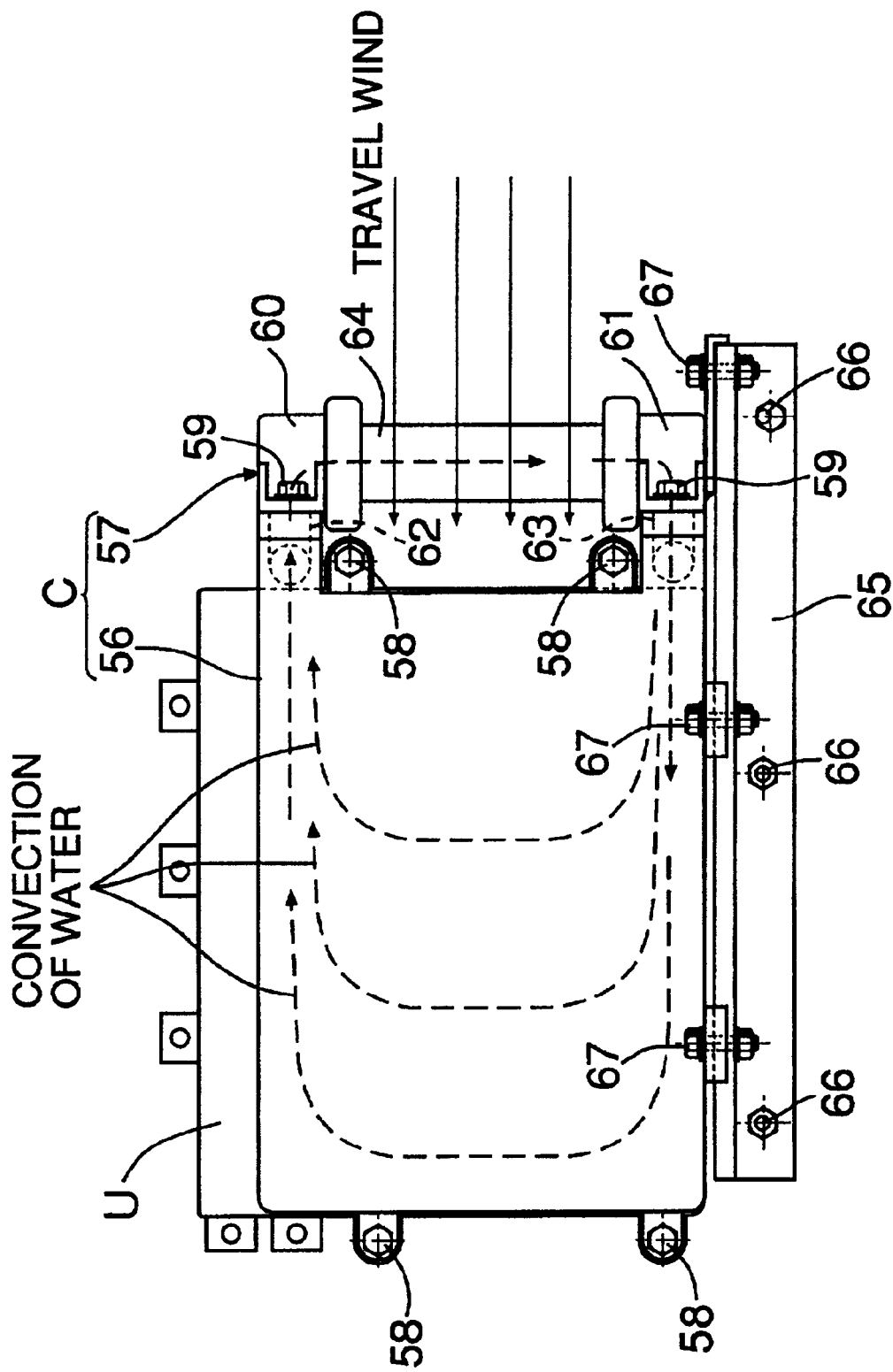
Figure 7:
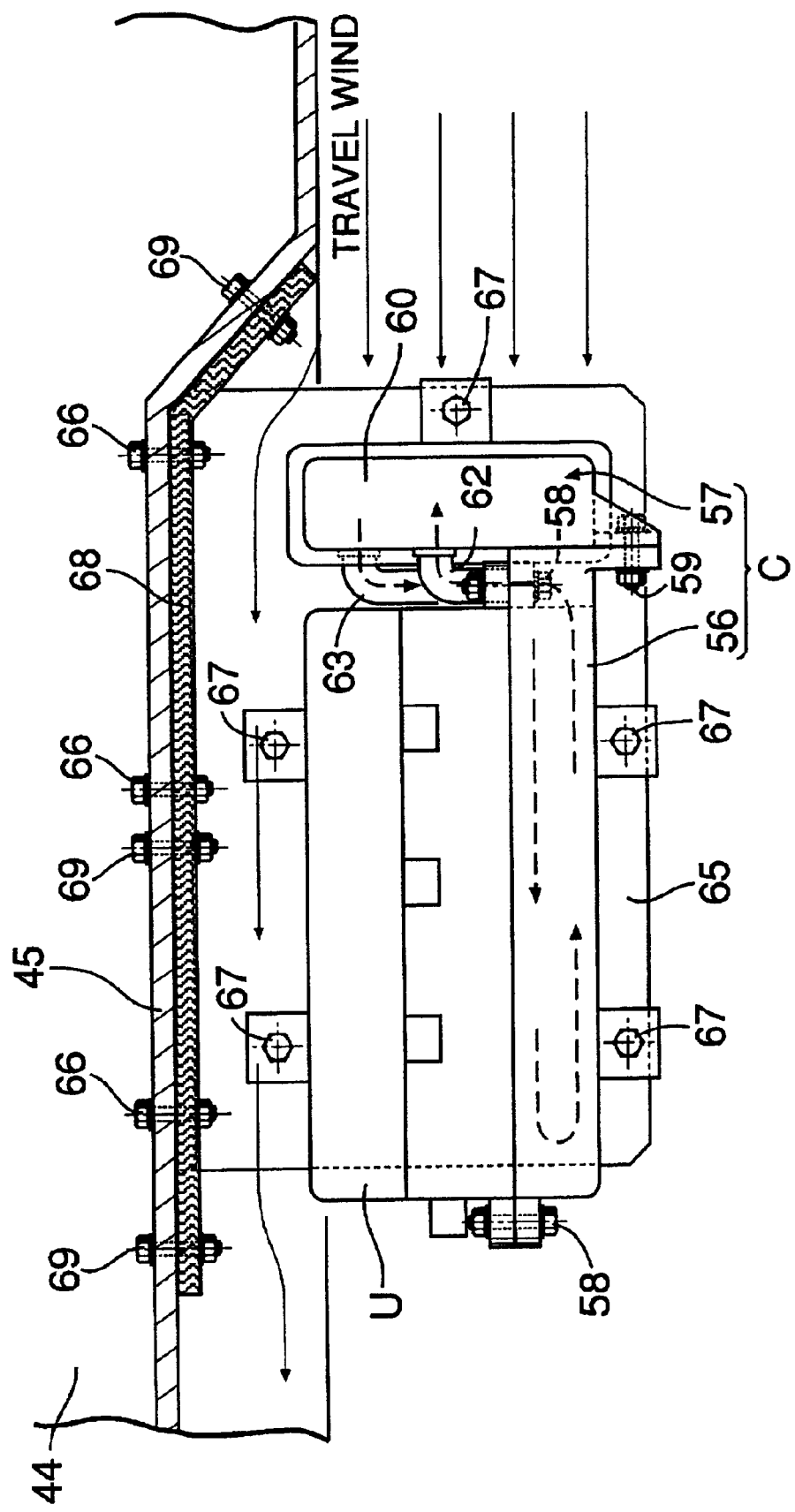

As can be seen from FIGS. 5 to 7, the power drive unit U is formed into a rectangular parallelepiped shape of a smaller lateral thickness, and the cooling device C formed is comprised of a water jacket 56 and a radiator 57 each of which is formed into rectangular parallelepiped shape. The water jacket 56 is made of aluminum and superposed onto and integrally coupled to the entire side face of the power drive unit U by bolts 58. The radiator 57 is disposed on front surfaces of the power drive units U and the waterjacket 56 to face forwards of the vehicle body and coupled to the water jacket 56 by bolts 59, 59. The waterjacket 56 is formed from a vessel within which cooling water can flow freely in a convection manner and communicates at its upper end lower ends with an upper tank 60 and a lower tank 51 of a radiator 57 through cooling-water pipes 62 and 63, respectively. The upper and lower tanks 60 and 61 of the radiator 57 are connected to each other by a radiator core 64 adapted to perform the heat exchange between cooling water and cooling air.

A plate-shaped support member 65 is fixed to a right side of the right front fender apron 45 by bolts 66, and the power drive unit U and the cooling device C integral with each other are fixed to an upper surface of the support member 65 by bolts 67. A heat shield plate 68 is fixed to a right side of the right front fender apron 45 by bolts 69, so that it is interposed between the right front fender apron 45 and the power drive unit U.

Operation of a preferred exemplary embodiment of the present invention having the above-described arrangement will be described below.

The power drive unit U controls a large amount of current of the motor-generator using a large-sized switching element. In order to ensure the durability of the power drive unit U, it is necessary to cool the power drive unit U. When the power drive unit U is heated, the cooling water within the water jacket 56 of the cooling device C mounted in contact with the power drive unit U takes heat from the power drive unit U, resulting in a rise in temperature thereof and thus, the convection of the cooling water is generated within the water jacket 56. This convection ensures that the cooling water is supplied through the cooling water pipe 62 to the radiator 57 and then returned via the upper tank 60, the radiator core 64 and the lower tank 61 of the radiator 57 and the cooling-water pipe 63 to a lower portion of the water jacket 56. During this time, the cooling water is heat-exchanged, in the radiator core 64, with the travel wind flowing into the radiator 64 through the travel wind intake port 70 (see FIG. 4) to become cooled. In this manner, the cooling water is circulated to the radiator 57 by utilizing the natural convection of the cooling water within the water jacket 56. Therefore, a special cooling-water pump is not required, thereby reducing the required, thereby reducing the required number of parts and the resulting cost.

The inside of the engine room 41 may be heated to a high temperature by heat generated by the engine E. However, the power drive unit U is accommodated in the power drive unit-accommodating chamber 55 separated from the engine room 41 with the right fender apron 45 interposed therebetween and, hence, it is difficult for the power drive unit U to receive the heat of the engine E, leading to an further enhanced cooling effect. Moreover, the heat of the engine E can be effectively shielded even further, because the heat shield plate 68 is interposed between the power drive unit U and the right front fender apron 45.

Further, the power drive unit U and the cooling device C are formed integrally with each other and supported on the right front fender apron 45. Therefore, the number of mounting steps and the number of parts can be reduced, as compared with a case where the power drive unit U and the cooling device C are attached separately to the vehicle body. In addition, because the power drive unit U is disposed outside the engine room 41, the layout of the auxiliary parts can be easily achieved by effectively utilizing the narrow internal space in the engine room 41.

Although a preferred exemplary embodiment of the present invention has been described in detail, it will be understood that various modifications in design may be made without departing from the subject matter of the present invention.

For example, the cooling device of the water-cooling type has been illustrated in the embodiment, but a cooling device of a cooling type utilizing a cooling fan or a cooling fin may be employed. In addition, the power drive unit-accommodating chamber 55 has been defined on the right of the engine room 41 in the embodiment, but may be defined on the left of the engine room 41.

What is claimed is:

1. A structure for cooling a an electric power drive unit for an automobile for controlling the operation of a motor-generator connected to an engine and functioning as either a motor or a generator, said structure comprising an electric power drive unit-accommodating chamber defined outside a side frame disposed on a side of an engine room with the engine accommodated therein in a widthwise direction of a vehicle, said chamber being separated from said engine room, said electric power drive unit being accommodated in said electric power drive unit-accommodating chamber and adapted to be cooled by travel wind.

2. A structure for cooling a power drive unit for an automobile according to claim 1, further comprising a heat shield plate disposed between said engine room and said electric power drive unit-accommodating chamber.

3. A structure for cooling a power drive unit for an automobile according to claim 2, wherein said electric power drive unit includes a cooling device adapted to use cooling water to perform heat exchange with the travel wind.

4. A structure for cooling a power drive unit for an automobile according to claim 3, wherein said electric power drive unit and said cooling device are formed integrally with each other and mounted to a vehicle body.

5. A structure for cooling a power drive unit for an automobile according to claim 1, wherein said electric power drive unit includes a cooling device adapted to use cooling water to perform heat exchange with the travel wind.

6. A structure for cooling a power drive unit for an automobile according to claim 5, wherein said electric power drive unit and said cooling device are formed integrally with each other and mounted to a vehicle body.

7. A structure for cooling a power drive unit for an automobile according to any of claims 1 to 6, wherein said electric motor-generator controlled by said electric power drive unit performs at least one of start of said engine and assistance for driving force of said engine, and performs at least one of power generation by the driving force from said engine and power generation by the regenerative braking of said engine.

8. A structure for cooling a power drive unit for an automobile according to claim 7, further comprising a crank pulley fixed to one end of a crankshaft of said engine wherein said motor-generator is accommodated within said crank pulley, and said electric power drive unit is provided at a position opposite from said crank pulley with the side frame disposed therebetween.

9. A structure for cooling a power drive unit for an automobile according to any of claims 1 to 6, further comprising a crank pulley fixed to one end of a crankshaft of said engine wherein said motor-generator is accommodated within said crank pulley, and said electric power drive unit is provided at a position opposite from said crank pulley with the side frame disposed therebetween.

* * * * *